Patented Nov. 10, 1931

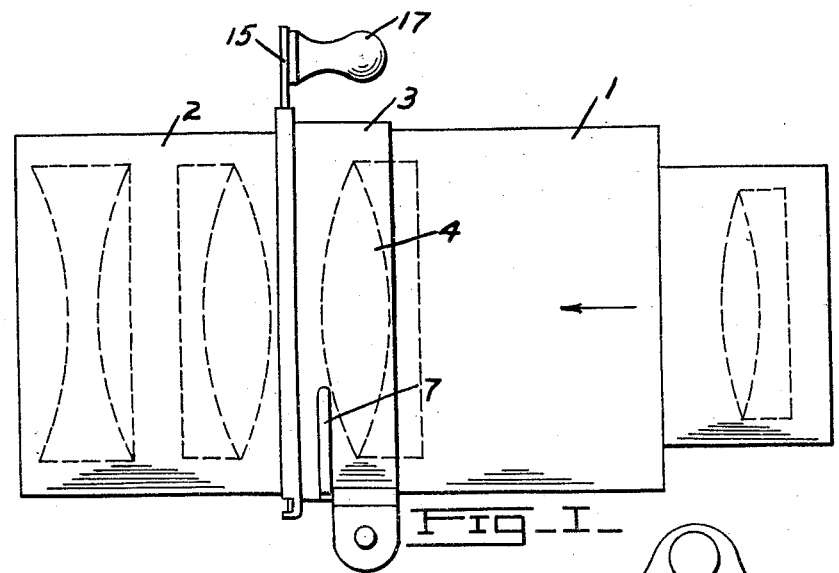
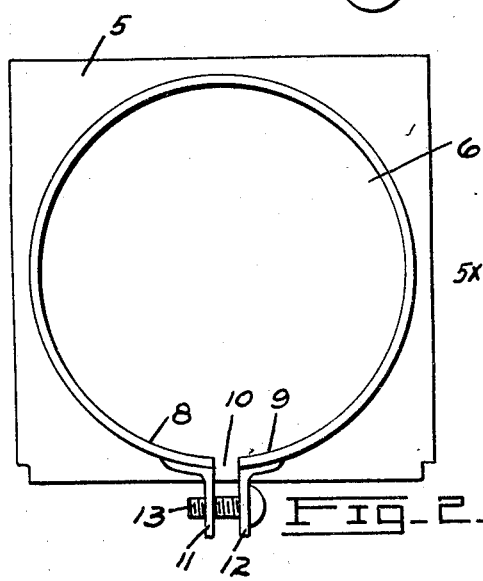
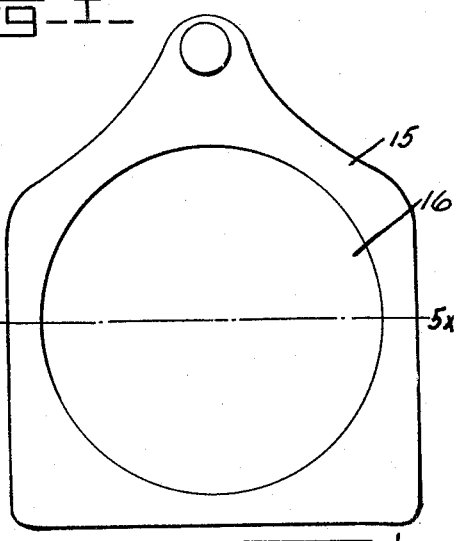
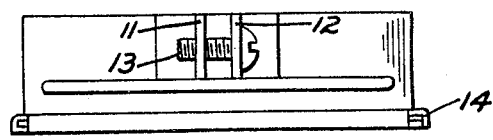

1,831,557

UNITED STATES PATENT OFFICE

WILLIAM F. FOUQUET, OF ROCHESTER, NEW YORK, ASSIGNOR TO PROJECTION OPTICS CO., OF ROCHESTER, NEW YORK

COUPLING FOR LENS MOUNTS

Application filed September 5, 1929. Serial No. 390,548.

The object of this invention is to provide a new and improved form of coupling for lens mounts for stereopticons and moving picture apparatus.

Another object of the invention is to make a coupling for lens mounts adaptable so that additional lenses can be easily and quickly added thereto to increase the size of the picture on the screen without interferring with or delaying the showing of the picture through the lenses.

These and other objects of the invention will be illustrated in the drawings, described in the specification and pointed out in the claims at the end thereof.

In the drawings:

Figure 1 is a side elevation of the standard lens mount with my improvement added thereto.

Figure 2 is an elevation of my improvement viewed from the right as shown in Figure 1.

Figure 3 is a bottom plan view of the mount shown in Figure 2.

Figure 4 is an elevation of the slide used to carry the extra lens.

Figure 5 is a horizontal section on the line 5x, 5x of Figure 4.

In the drawings like reference numerals indicate like parts.

In the drawings reference numeral 1 indicates the sleeve that carries the assembly of lenses for a moving picture or stereopticon apparatus. These lenses will throw on the screen at a given distance a picture of a particular size. It is sometimes necessary to increase the size of the picture thrown on the screen as for instance when a smaller negative is used which of itself would give a smaller picture. In such cases it is frequently desirable to increase the size of the picture on the screen to the same size that would appear if a larger negative were used.

To secure this result I provide an extra sleeve 2 containing certain lenses therein which I mount in front of the sleeve 1 so that the light will travel through all the lenses. The second series of lenses contained in the sleeve 2 would be adapted to enlarge the picture that is thrown on the screen and bring it to the desired size, although it is made by an undersize negative.

For this purpose I provide an attachment or coupling 3 which consists of a sleeve 4 that is adapted to embrace the sleeve 1 and be clamped thereon. This sleeve 4 carries a socket plate 5 on the forward end thereof which plate has inturned flanges extending forwardly therefrom on the two sides and bottom thereof. These flanges are spaced an equal distance from the center of the round opening 6 formed in the socket plate 5.

On the lower side, the sleeve 3 is slit circumferentially as indicated at 7 through an arc of about 120 degrees. Two tongues 8 and 9 are thus formed on the sleeve which tongues are cut away as indicated at 10 to leave an opening between the ends thereof. On the ends of these tongues are fastened lugs 11 and 12 in any suitable manner. These lugs can be drawn together by a screw 13. The sleeve 3 is adapted to make a close working or sliding fit with the sleeve 1 which carries the original set of lenses. By turning the screw 13 the tongues 11 and 12 will be drawn together around the sleeve 1 and this will cause the sleeve 3 to clamp the sleeve 1 very securely thus holding the attachment in place thereon.

The second sleeve 2 makes threaded engagement with the slide 15 which slide has a threaded opening 16 therein as shown at 18. At the top of the slide 15 is provided a handle 17. When it is desired to change the size of the picture on the screen, the slide 15 carrying the sleeve 2 with the lens assembly therein is dropped into the socket 14 carried on the plate 5 and is thereby securely held in place with the central axis of the lenses carried in the sleeve 1 and 2, substantially in line with each other. In this position, the lenses of the second sleeve enlarge the picture on the screen as may be desired. When it is desired to remove the second set of lenses the slide 15 is removed taking the extra set of lenses with it and the picture on the screen will then conform to what is normally shown by the lenses carried in the sleeve 1.

This attachment is desirable in the showing of moving pictures where a movie-tone film follows or precedes a motion picture film of the old or silent type. In the movie-tone film a part of the film is used for sound reproduction and the space allotted to the negative of the picture is correspondingly reduced or made smaller. With the same lenses the smaller negatives of the movie-tone film will throw a correspondingly smaller picture on the screen than will the larger negative of the silent film. When a movie-tone film follows a silent film the picture on the screen will appear smaller, but by the use of this attachment with the extra set of lenses the picture on the screen will be enlarged to the same size as the picture that was made of the preceding silent film. When the running of the movie-tone film has been ended and another silent film is used, the extra lenses can be removed and this insertion and removal of the extra lenses can be done by the operator without otherwise interfering with the continuous operation of the machine and the continuous projection of the picture on the screen keeping the pictures on the screen, however, of the same size although they are made from negatives of different sizes.

I claim:

1. A coupling for lens mounts comprising a sleeve slit circumferentially and longitudinally with intersecting slits to form two tongues therein, said sleeve being adapted to engage the sleeve of a lens mount, means for drawing said tongues together to clamp the coupling sleeve on the sleeve of the lens mount, a socket formed on the outer end of the coupling sleeve, a slide adapted to engage in said socket, said slide having an opening therein normally located substantially concentric with the lens sleeve, a second means for supporting a second lens mount in said opening, said slide and second lens sleeve supported thereby being adapted to be quickly inserted in the socket or removed therefrom to change the magnifying power of the lenses of the first lens mount.

2. A coupling for lens mounts comprising a coupling sleeve, means provided thereon by which it is adapted to be clamped to the sleeve of a lens mount, a socket formed on the outer ends of the coupling sleeve, and a slide adapted to engage in said socket, said slide having an opening therein normally located substantially concentric with the lens sleeve, a second means for supporting a second lens mount in said opening, said slide and second lens sleeve supported thereby being adapted to be quickly inserted in the socket or removed therefrom to change the magnifying power of the lenses of the first lens mount.

In testimony whereof I affix my signature.

WILLIAM F. FOUQUET.